Sept. 4, 1934.        J. O. LIFFLANDER         1,972,685
                    CLUTCH CONTROL DEVICE
                     Filed July 9, 1931        3 Sheets-Sheet 3
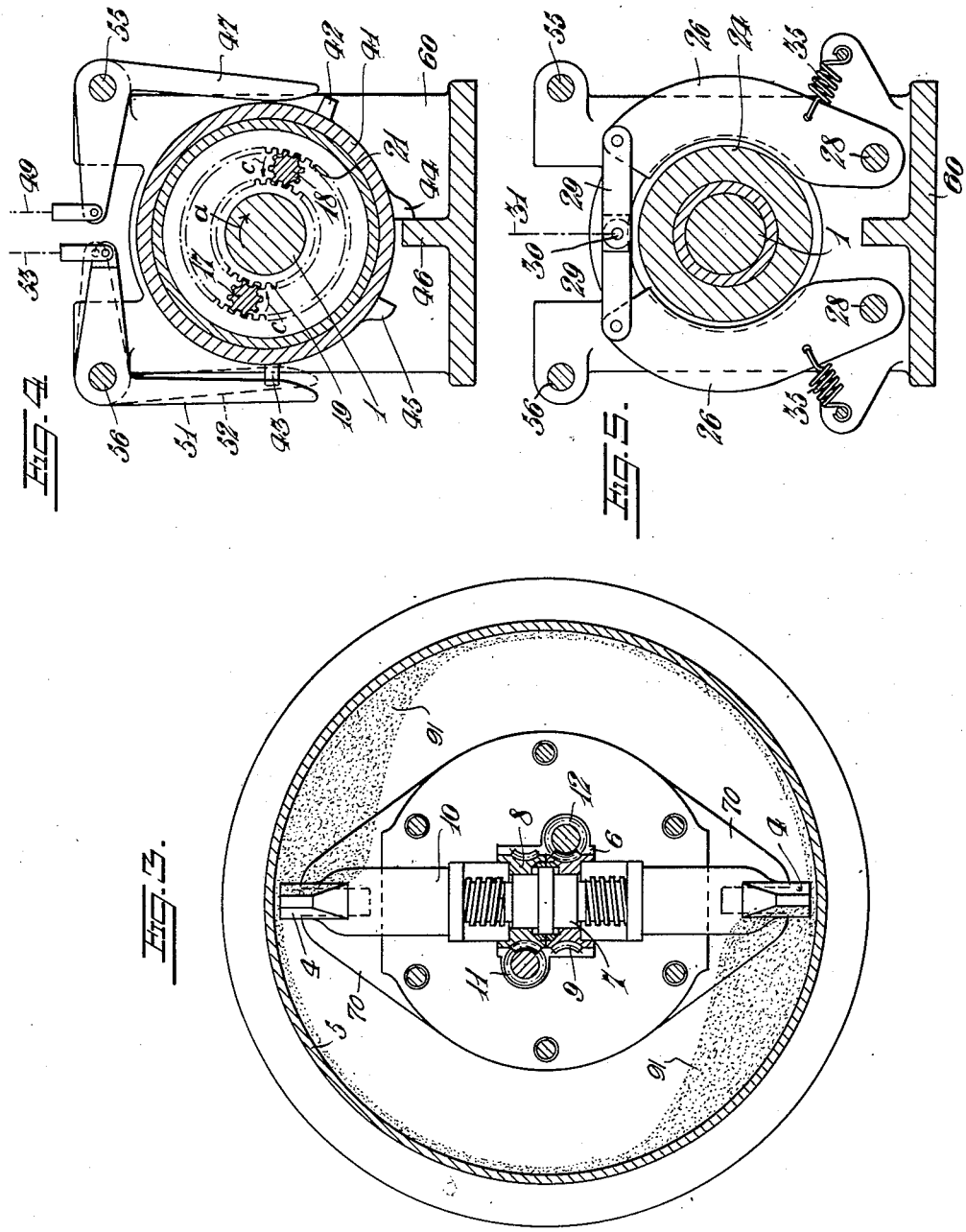

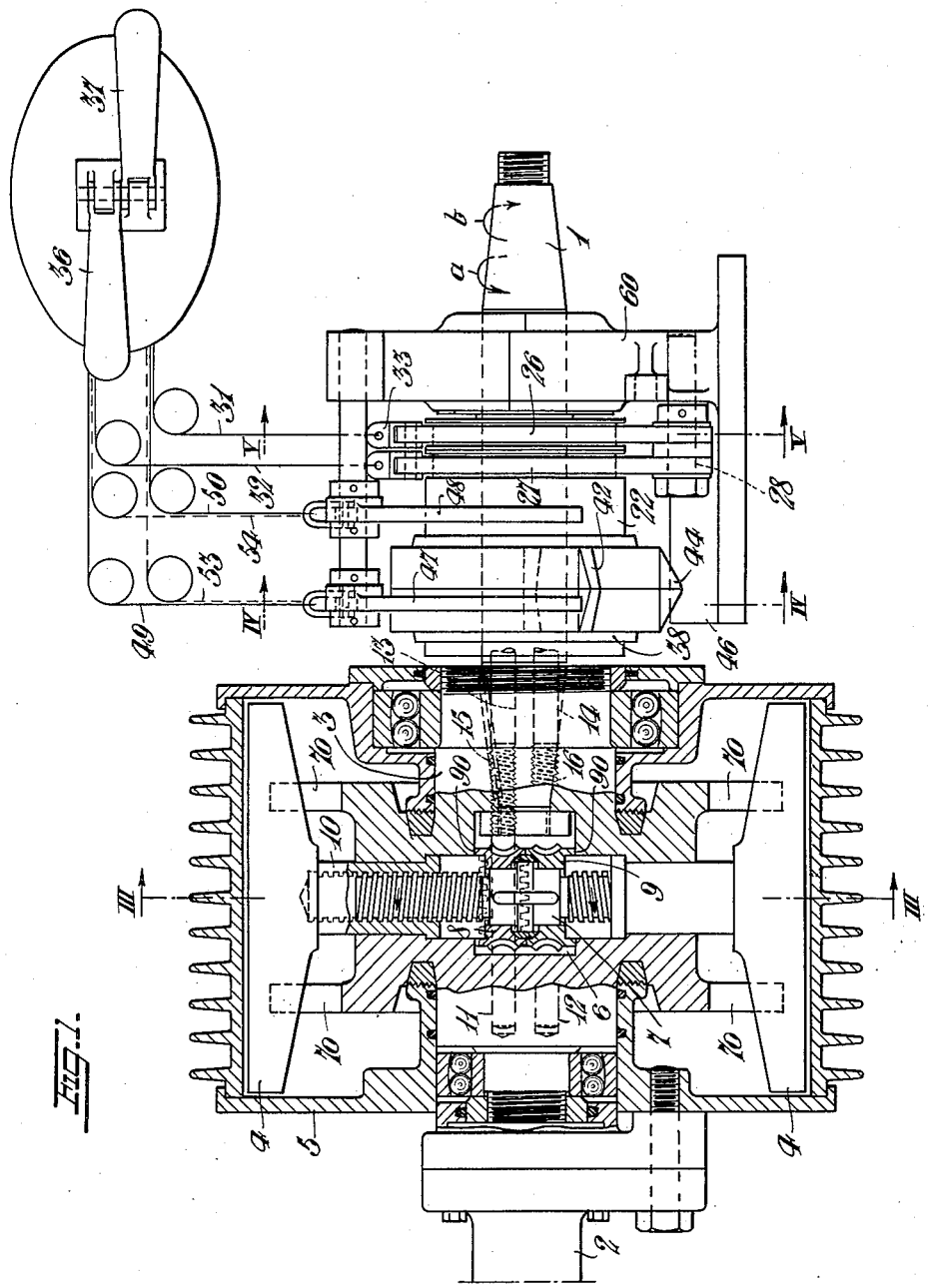

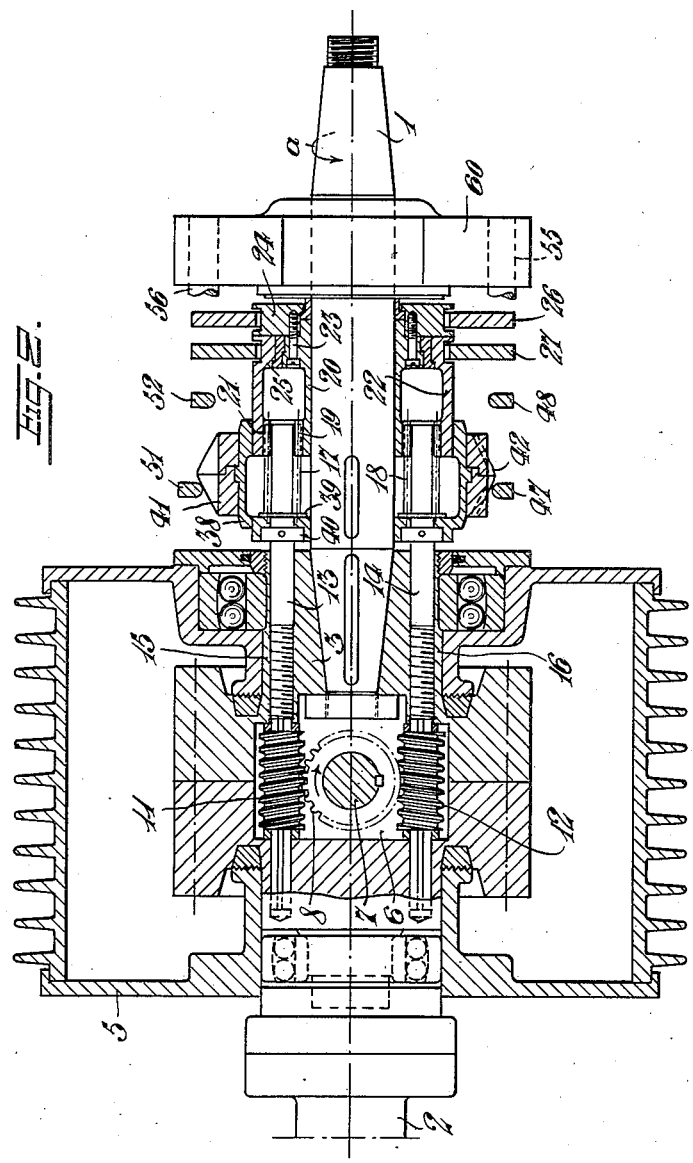

Patented Sept. 4, 1934

1,972,685

UNITED STATES PATENT OFFICE 1,972,685

CLUTCH CONTROL DEVICE

Johan Oscar Lifflander, Stockholm, Sweden, assignor to Pulvis Aktiengesellschaft, Glarus, Switzerland, a corporation of Switzerland Application July 9, 1931, Serial No. 549,682
In Sweden May 27, 1930

18 Claims. (Cl. 192—35)

This invention relates to a controlling device for the engagement and disengagement of clutches and the like, and the object of the invention is to render the controlling operation easy and reliable, even where it is to be effected against a high resistance or requires a rather long period of time.

The invention is characterized, chiefly, by the fact that the power to effect the controlling operation under consideration as, for instance, the connection or disconnection of a clutch, is derived from the driving shaft in connection with which the clutch or the like is provided.

Reference will now be made to the accompanying drawings which illustrate one embodiment of the invention.

Figure 1 shows a side elevation of a controlling device according to the invention as applied to an engaging and disengaging elastic clutch which is shown in section.

Figure 2 is a horizontal axial section of the clutch and the controlling device.

Figure 3 is a cross section of the clutch on the line III—III in Figure 1, and

Figures 4 and 5 are cross sections of the controlling device on the lines IV—IV and V—V, respectively, in Figure 1.

In the drawings, reference character 1 designates the driving shaft which, for instance, may be directly or indirectly connected to a motor shaft. 2 is the shaft to be driven, for instance, a propeller shaft. In the example shown, the shaft 1 is assumed to be capable of rotation in both directions, though means to so drive the shaft are not shown, because such means do not form part of the present invention. Inserted between the two shafts 1 and 2 is an engaging and disengaging clutch. This clutch is shown in the drawings as an elastic clutch of the type which comprises an inner blade wheel and a surrounding casing which is rotatable relative to said blade wheel and partially filled with a powdered or granular substance 91 which forms the power transmitting medium between the blade wheel and the casing, when it is caused due to the rotation of said blade wheel or casing to move towards the periphery of the casing and accumulate as a drift in front of each blade, as is shown in Fig. 3, thereby yieldingly locking the blades to the casing. The blade wheel comprises the hub body 3 keyed to the shaft 1 and diametrically positioned blades 4 of substantial axial extension which are movable inwards and outwards in a radial direction. The casing 5 is secured to the shaft 2 and is rotatably mounted on the hub body 3 so as to constitute a drum enclosing the blades which is formed with a cylindrical peripheral wall which may, preferably, be provided with heat radiating flanges on its outer surface.

The hub 3 is provided with four radial guideways 70 for the blades 4 and is formed in two parts enclosing a central space 6. Extending diametrically through said space is a bolt or threaded member 7 having a non-threaded central portion and right hand and left hand threads beyond said central portion. Keyed to the central portion of the bolt are two worm wheels 8, 9, one having a right hand thread and the other a left hand thread. The worm wheels are restrained from radial displacement in the space 6 by the end flanges 90. The threaded portions of the bolt 7 are each in mesh with a threaded bushing 10 formed integrally with, or rigidly secured to, the respective blade 4. The bushings 10 are rotatably and slidably mounted in corresponding radial borings in the hub body 3 and will, as a result, hold the bolt 7 against movement in the longitudinal direction of the shaft 1.

Engaging the worm wheel 8 is a worm 11 parallel to the shaft 1, and engaging the worm wheel 9 is a similar worm 12. The worms 11 and 12 are mounted on opposite sides of the bolt 7 and are threaded in opposite directions, as will appear from Figure 2. The stems 13, 14 of the worms 11, 12, which may be termed control shafts, are rotatably and slidably mounted in corresponding bores in the hub body 3. Along part of their length they are screw threaded, as shown at 15 and 16, respectively, and engage with their threaded portions corresponding threads in said bores. The stems project beyond one end of the hub body. On its portion thus extending along the shaft 1 each stem carries a pinion 17 and 18, respectively, of substantial axial length. Said pinions mesh on one side with an externally toothed gear 19 provided on a hub 20 rotatably mounted on the shaft 1 and on the other side with an internally toothed gear 21 of a bushing 22 rotatably mounted on the hub 20. Rigidly connected to the hub 20 by means of a series of bolts 23 is a brake ring 24, and a similar brake ring 25 is formed integrally with the bushing 22.

The brake rings are surrounded by pairs of brake shoes 26 and 27, respectively. In Figure 5 the brake shoes 26 of ring 24 are shown. These two brake shoes are fulcrumed on pins 28 at their one (lower) ends and are connected to each other at their other (upper) ends by means of a pair of links 29 having a common pivot 30, to which is connected a controlling chain or rope. In Figure 1, the controlling rope for the brake shoes 26 is shown at 31, and the controlling rope for the brake shoes 27 is shown at 32. Both of said ropes are shown as attached to the respective pivot pins by straps 33 and 34, respectively. The brake shoes are acted on by springs 35, Figure 5, which tend to maintain them out of operative position. The controlling ropes 31, 32 are connected to controlling levers 36 and 37, respectively.

Mounted to slide on the shaft 1 and the bushing 22 is a cup-shaped sleeve 38 through the bottom of which the stems 13 and 14 are rotatably but not slidably extended, each bottom being clamped between a rigid collar 39 and a loose collar 40 on the respective stem. The sleeve 38 carries on its circumference a divided ring 41 having a pair of almost diametrically opposite axial double cams 42 and 43 of wedge-shaped axial section. The ring 41 is held only by friction to the sleeve 38 so that it will tend to rotate with the sleeve. At the same time, however, the ring is adapted to oscillate within only a small angle and, in order to stop it in the desired position, it is provided with two abutments 44 and 45 adapted to engage a fixed stop 46 on the frame 60 of the device.

Provided in the path of the double cam 42 are two bell crank levers 47 and 48, Figure 1, one, 47, connected to the controlling lever 37 through the rope 49 and the other, 48, connected to the controlling lever 36 through the rope 50. Provided in the path of the double cam 43 are two similar bell crank levers 51 and 52 one of which, 51, is shown in Figure 4. In Figure 2, all of said bell crank levers are shown in section at 47, 48, 51 and 52, respectively. The bell crank lever 51 is connected by the rope 53 to the controlling lever 36, and the bell crank lever 52 is connected by the rope 54 to the controlling lever 37. The bell crank levers 47 and 48 are mounted on a shaft 55 parallel to the shaft 1 which is attached to the frame 60 of the device, and the bell crank levers 51 and 52 are mounted on a similar shaft 56.

The operation of the device is as follows:—Assuming that the shaft 1 rotates in the direction of the arrow $a$ and that the blades 4 are in the position shown in Figure 1, whereby the casing 5 and, therefore, also the shaft 2 are driven in the well-known way through the intermediary of the powdered substance 91 contained in the clutch. Should it now be desired to disengage the clutch by moving the blades inwards, the controlling lever 37 is shifted. The shifting of this lever pulls the ropes 32, 49 and 54 upwards. The rope 32 causes the brake shoes 27 to engage the brake ring 25, whereas the ropes 49 and 54 will move the levers 47 and 52 inwards towards the shaft. Due to the rotation of the shaft 1 the ring 41 which carries the cams 42 and 43 has been rotated, until it has been stopped in a position in which the abutment 44 bears against the stop 46, as is shown in Figure 4. In this position the cam 43 is in an operative condition. Due to the braking of the ring 25 the bushing 22 with the toothed rim 21 is prevented from rotating. The pinions 17 and 18 meshing with the toothed rim 21 carried by the stems 13 and 14 rotating with shaft 1 are now caused to rotate about their own axes in the direction indicated by the arrows $c$ in Figure 4. In turn, they rotate the hub 20, said rotation, however, being of no importance in this connection. The worms 11 and 12 of the stems 13 and 14 rotate the worm wheels 8 and 9 in such a direction as to move the bushings 10 with the blades 4 inwards. The stems 13 and 14 during this rotation screw themselves outwardly (to the right in Figure 2) due to their threaded portions 15 and 16 and in this movement they move the sleeve 38 together with the cam ring 41 with them, until the cam 43 of said cam ring engages the inwardly swung lever 52 and causes it to swing outwards. This operation takes place before the blades 4 reach the bottom of the guide-ways 70. The lever 52, when swinging outwards, pulls the rope 54 downwards, thereby swinging the controlling lever 37 back to its prior position. As a result, the brake 27 is released, and the lever 47 is restored to inoperative position. The releasing of the brake 27 causes a release of the bushing 22, thereby stopping the rotation of the pinions 17 and 18 about their own axes and, consequently, the inward motion of the blades ceases. In this way the inward motion of the blades is positively stopped in a definite position so that the blades cannot move inwards to such an extent as to cause damage of any parts of the clutch. After the controlling operation is completed, the blades are in the released condition and the stems 13 and 14 together with the sleeve 38 with the cam ring 41 are in their outer (right hand) extreme position.

No transmission of power is now taking place to shaft 2.

If, on the other hand, it is desired to engage the clutch and, assuming the shaft 1 is still rotating in the direction of arrow $a$, then the controlling lever 36 is shifted, resulting in a tightening of the brake 26 and a braking of the hub 20 with the toothed rim 19. At the same time, the ropes 50 and 53 are pulled upwards, causing the levers 48 and 51 to swing inwards. The pinions 17, 18 are now caused to rotate about their own axes in the opposite direction to that in which they were rotating previously and, as a result, they rotate the worm wheels oppositely to the previous rotation thereof, thereby causing the blades to move outwards. At the same time, the stems are screwing themselves inwards (to the left) until the cam 43 engages the lever 51 which is in its inner position and causes same to move outwards so as to pull the rope 53 downwards and restore the lever 36 to normal, thereby interrupting the braking of the toothed rim 19 and thus causing the outward motion of the blades to cease. This is effected prior to the blades reaching the periphery of the drum 5 so that also in this case no parts may be damaged on account of too extended movement of the blades. The clutch is now in the engaged condition.

Assuming, however, that the shaft 1 is rotating in the direction of the arrow $b$ and the blades should be pulled inwards, then the controlling lever 36 should be shifted and, if it is desired to move the blades outwards, then the controlling lever 37 should be shifted. The operation now taking place, however, is easy to understand by considering the foregoing description, and need not be set forth in detail.

What I claim is:—

1. In a clutch, shiftable members to allow disengaging of the clutch, a driving shaft, a rotatable shaft for controlling said shiftable members, a hub member secured to said driving shaft, a threaded shaft meshing in a threaded bore in said hub member so as to move axially and rotationally at the same time, a pinion gear carried by said threaded shaft, an externally toothed gear, and an internally toothed gear engaged by said pinion gear, said internally and externally toothed gears being mounted concentrically relative to said driving shaft and rotationally both in respect thereto and to each other, an individual braking device for each of the last mentioned gears and means to release said braking devices due to the movement of the threaded shaft in the threaded bore.

2. In a clutch, shiftable members to allow disengaging of the clutch, a driving shaft, a rotatable shaft for controlling said shiftable members, a hub member secured to said driving shaft, a threaded shaft meshing in a threaded bore in said hub member so as to move axially and rotationally at the same time, a pinion gear carried by said threaded shaft, an externally toothed gear and an internally toothed gear engaged by said pinion gear, said internally and externally toothed gears being mounted concentrically relatively to said driving shaft and rotationally both in respect thereto and to each other, an individual braking device for each of the last mentioned gears, a cam disc axially movable with the threaded shafts and provided with axial cams, and movable engaging members operable by said cams to release the braking devices due to the movement of the threaded shaft in the threaded bore.

3. In a clutch, shiftable members to allow disengaging of the clutch, a driving shaft, a rotatable shaft for controlling said shiftable members, a hub member secured to said driving shaft, a threaded shaft meshing in a threaded bore in said hub member so as to move axially and rotationally at the same time, a pinion gear carried by said threaded shaft, an externally toothed gear and an internally toothed gear engaged by said pinion gear, said internally and externally toothed gears being mounted concentrically relatively to said driving shaft and rotationally both in respect thereto and to each other, an individual braking device for each of the last mentioned gears, a cam disc having two axial cams, a body to carry said cam disc rotatable with the driving shaft and axially movable with the threaded shaft in such a way as to cause said body to move the cam disc by friction, and a stationary stop to limit the rotation of the cam disc in both directions in such a way that the cam disc upon the rotation of the driving shaft in cne direction will be stopped in a position in which one cam is in operative position whereas, and in the rotation of the driving shaft in the other direction the cam disc will be stopped with the other cam in operative position.

4. In a clutch, shiftable members to allow disengaging of the clutch, a driving shaft, a rotatable shaft for controlling said shiftable members, a hub member secured to said driving shaft, a threaded shaft meshing in a threaded bore in said hub member so as to move axially and rotationally at the same time, a pinion gear carried by said threaded shaft, an externally toothed gear and an internally toothed gear engaged by said pinion gear, said internally and externally toothed gears being mounted concentrically relatively to said driving shaft and rotationally both in respect thereto and to each other, an individual braking device for each of the last mentioned gears, a cam disc axially movable with the threaded shaft, axial cams on said cam discs, movable engaging members to be operated by said cams to release the braking devices due to the movement of the threaded shaft in the threaded bore, and controlling levers, each of said levers being connected to an individual one of the braking devices and to two of said engaging members, one for each direction of rotation.

5. In a clutch, a driving shaft, a hollow drum rotatably mounted on said shaft, a hub affixed to said shaft within said drum, radially extending blades carried by said hub, a quantity of finely divided material partially filling said drum and of such a nature as to form power transmitting drifts in front of said blades, means for moving said blades in a radial direction to vary the engagement thereof with said drifts, said means being engageable with said driving shaft for deriving power therefrom to move said blades, and means for limiting the radially outward motion of said blades to prevent them from contacting said drum.

6. In a clutch, a driving shaft, a hollow drum rotatably mounted on said shaft, a hub affixed to said shaft within said drum, radially extending blades carried by said hub, a quantity of finely divided material partially filling said drum and of such a nature as to form power transmitting drifts in front of said blades, an externally toothed gear and an internally toothed gear rotatably mounted on said shaft, a control shaft journaled in said hub, a gear on said control shaft meshing with both said externally toothed gear and said internally toothed gear, means for reducing the rotational speed of either of the two last mentioned gears with respect to the rotational speed of said shaft, means for transmitting power from said control shaft to said blades to move said blades in a radial direction to vary the engagement thereof with said drifts, and means for limiting the radially outward motion of said blades to prevent them from contacting said drum.

7. In a clutch, a driving shaft, a hollow drum rotatably mounted on said shaft, a hub affixed to said shaft within said drum, radially extending blades carried by said hub, a quantity of finely divided material partially filling said drum and of such a nature as to form power transmitting drifts in front of said blades, an externally toothed gear and an internally toothed gear rotatably mounted on said shaft, a control shaft journaled in said hub, a gear on said control shaft meshing with both said externally toothed gear and said internally toothed gear, means for reducing the rotational speed of either of the two last mentioned gears with respect to the rotational speed of said shaft, a threaded member journaled in said hub and having threaded engagement with said blades, means for transmitting rotary motion from said control shaft to said threaded member, and means for limiting the radially outward motion of said blades to prevent them from contacting said drum.

8. In a clutch, a driving shaft, a hollow drum rotatably mounted on said shaft, a hub affixed to said shaft within said drum comprising radial guides, radially extending blades carried by said guides, a quantity of finely divided material partially filling said drum and of such a nature as to form power transmitting drifts in front of said blades, a threaded member having threaded engagement with said blades for moving the blades radially in said guides, means for transmitting rotary motion from said shaft to said threaded member, and means for limiting the radially outward motion of said blades to prevent them from contacting said drum.

9. In a clutch, a driving shaft, a hollow drum rotatably mounted on said shaft, a hub affixed to said shaft within said drum, radially extending blades carried by said hub, a quantity of finely divided material partially filling said drum and of such a nature as to form power transmitting drifts in front of said blades, a threaded member having threaded engagement with said blades for moving the blades in a radial direction, a gear affixed to the central part of said member, a pair of control shafts journaled in said hub, gears on said control shafts meshing with the first mentioned gear, means for engaging said control shafts with said driving shaft for rotating said control shafts in either direction, and means for limiting the radially outward motion of said blades to prevent them from contacting said drum.

10. In a clutch, a driving shaft, a hollow drum rotatably mounted on said shaft, a hub affixed to said shaft within said drum, radially extending blades carried by said hub, a quantity of finely divided material partially filling said drum and of such a nature as to form power transmitting drifts in front of said blades, a member having threads of opposite pitch adjacent to opposite ends thereof, one end of said member having threaded engagement with one of said blades and the other end with another of said blades, a gear affixed to the central part of said member, a pair of control shafts journaled in said hub on opposite sides of said driving shaft, worm gears of opposite pitch affixed to said control shafts and meshing with said gear on said member, means for engaging said control shafts with said driving shaft for rotating said control shafts in either direction, and means for limiting the radially outward motion of said blades to prevent them from contacting said drum.

11. In a clutch, a driving shaft, a hollow drum rotatably mounted on said shaft, a hub affixed to said shaft within said drum, radially extending blades carried by said hub, a quantity of finely divided material partially filling said drum and of such a nature as to form power transmitting drifts in front of said blades, a member having threads of opposite pitch adjacent to opposite ends thereof, one end of said member having threaded engagement with one of said blades and the other end with another of said blades, a gear affixed to the central part of said member, a pair of control shafts journaled in said hub, on opposite sides of said driving shaft, worm gears of opposite pitch affixed to said control shafts and meshing with said gear on said member, an externally toothed gear and an internally toothed gear rotatably mounted on said driving shaft, a gear on each of said control shafts meshing with both said externally toothed gear and said internally toothed gear, means for reducing the rotational speed of either of the two last mentioned gears with respect to the rotational speed of said shaft, and means for limiting the radially outward motion of said blades to prevent them from contacting said drum.

12. In a clutch, shiftable members to allow engaging and disengaging of the clutch, a driving shaft, means to shift said members by power derived from said shaft comprising braking means, and automatic means for releasing said braking means when said members have been shifted to their extreme engaged or disengaged positions.

13. In a clutch, a driving shaft, a hollow drum rotatably mounted on said shaft, a hub affixed to said shaft within said drum, radially extending blades carried by said hub, a quantity of finely divided material partially filling said drum and of such a nature as to form power transmitting drifts in front of said blades, means for moving said blades in a radial direction to vary the engagement thereof with said drifts, said means being engageable with said driving shaft for deriving power therefrom to move said blades, and automatic means for disengaging the last mentioned means when said blades have been moved to extreme positions.

14. In a clutch, a driving shaft, a hollow drum rotatably mounted on said shaft, a hub affixed to said shaft within said drum, radially extending blades carried by said hub, a quantity of finely divided material partially filling said drum and of such a nature as to form power transmitting drifts in front of said blades, an externally toothed gear and an internally toothed gear rotatably mounted on said shaft, a control shaft journaled in said hub, a gear on said control shaft meshing with both said externally toothed gear and said internally toothed gear, means for reducing the rotational speed of either of the two last mentioned gears with respect to the rotational speed of said shaft, means for transmitting power from said control shaft to said blades to move said blades in a radial direction to vary the engagement thereof with said drifts, and automatic means for rendering inoperative the speed reducing means when said blades have been moved to extreme positions.

15. In a clutch, a driving shaft, a hollow drum rotatably mounted on said shaft, a hub affixed to said shaft within said drum, radially extending blades carried by said hub, a quantity of finely divided material partially filling said drum and of such a nature as to form power transmitting drifts in front of said blades, an externally toothed gear and an internally toothed gear rotatably mounted on said shaft, a control shaft journaled in said hub, a gear on said control shaft meshing with both said externally toothed gear and said internally toothed gear, means for reducing the rotational speed of either of the two last mentioned gears with respect to the rotational speed of said shaft, a threaded member journaled in said hub and having threaded engagement with said blades, means for transmitting rotary motion from said control shaft to said threaded member to move said blades in a radial direction, and automatic means for rendering inoperative the speed reducing means when said blades have been moved to extreme positions.

16. In a clutch, a driving shaft, a hollow drum rotatably mounted on said shaft, a hub affixed to said shaft within said drum comprising radial guides, radially extending blades carried by said guides, a quantity of finely divided material partially filling said drum and of such a nature as to form power transmitting drifts in front of said blades, a threaded member having threaded engagement with said blades for moving the blades radially in said guides, means for transmitting rotary motion from said shaft to said threaded member, and automatic means for rendering the last mentioned means inoperative when said blades have been moved to extreme positions.

17. In a clutch, a driving shaft, a hollow drum rotatably mounted on said shaft, a hub affixed to said shaft within said drum, radially extending blades carried by said hub, a quantity of finely divided material partially filling said drum and of such a nature as to form power transmitting drifts in front of said blades, a threaded member having threaded engagement with said blades for moving the blades in a radial direction, a gear affixed to the central part of said member, a pair of control shafts journaled in said hub, gears on said control shafts meshing with the first mentioned gear, means for engaging said control shafts with said driving shaft for rotating said control shafts in either direction, and automatic means for rendering said last mentioned means inoperative when said blades have been moved to extreme positions.

18. In a clutch, shiftable members to allow engaging and disengaging of the clutch, a driving shaft, means deriving power from said shaft for shifting said members, means engageable with the first mentioned means for rendering said first mentioned means operative to shift said members, and automatic means for disengaging the last mentioned means from said first mentioned means when said members have been shifted to their extreme engaged or disengaged positions.

JOHAN OSCAR LIFFLANDER.